UNITED STATES PATENT OFFICE.

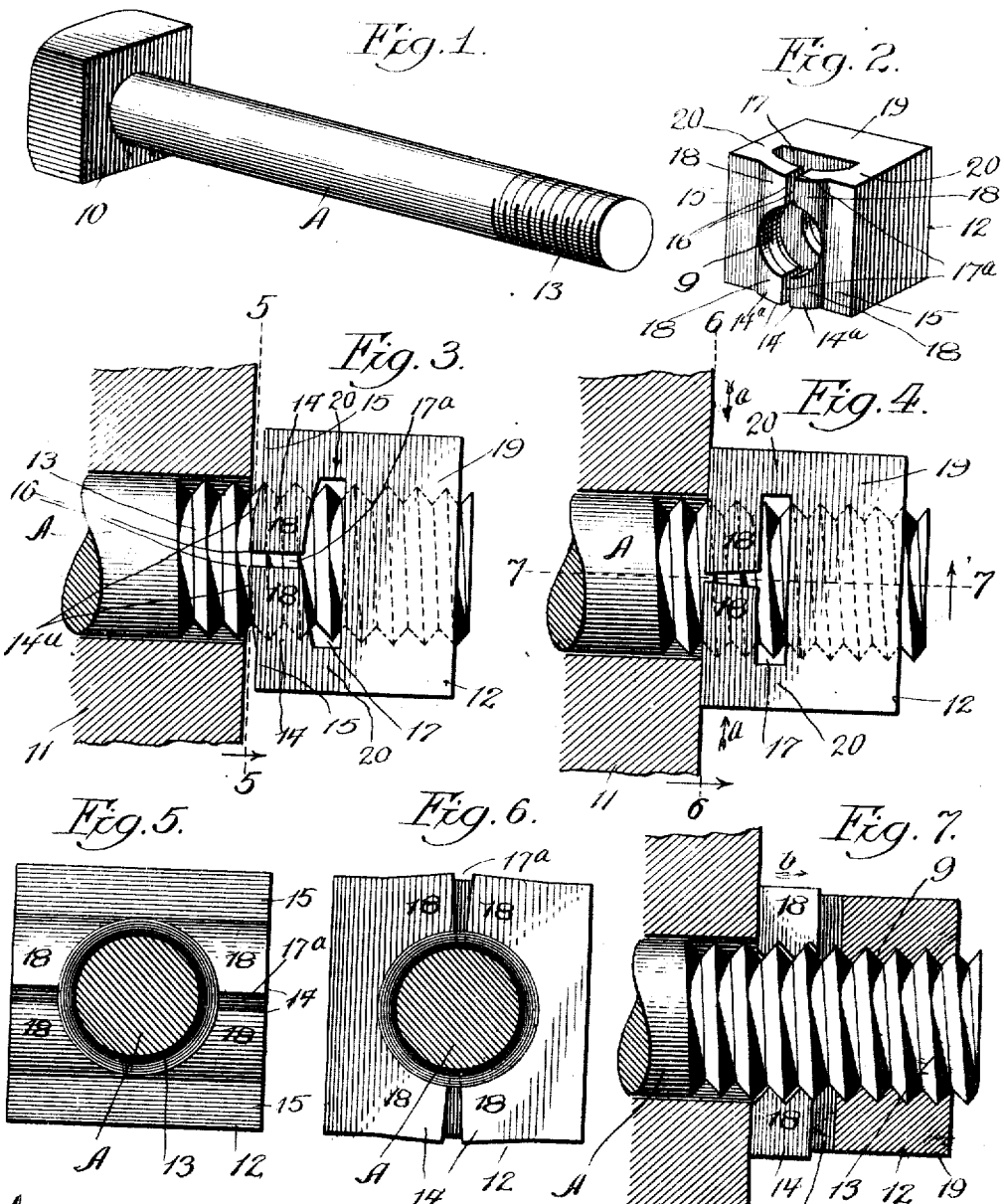

WILLIAM R. McCOLLOM, OF CHICAGO, ILLINOIS.

NUT-LOCK.

1,238,796.  Specification of Letters Patent.  Patented Sept. 4, 1917.

Application filed December 26, 1916. Serial No. 138,730.

*To all whom it may concern:*

Be it known that I, WILLIAM R. McCOLLOM, a citizen of the United States, and a resident of Chicago, county of Cook, and State of Illinois, have invented certain new and useful Improvements in Nut-Locks, of which the following is declared to be a full, clear, and exact description.

This invention relates to nut locks, and particularly to that type of nut locks in which the locking device is made integral with the nut itself. The object of this invention is to simplify, to cheapen, and to produce a highly efficient lock nut. With these and other objects in view, this invention consists in the several novel features hereinafter fully set forth and claimed.

The invention is clearly illustrated in the accompanying drawing, in which:

Figure 1, is a perspective view of an ordinary bolt; Fig. 2, is a perspective view of the nut; Fig. 3, is a side view of a fragment of the bolt and the nut, showing an object which is to be held thereby, in cross section; Fig. 4, is a view similar to Fig. 3, except that the nut has been screwed home; Fig. 5, is a cross section taken on line 5—5 of Fig. 3; Fig. 6, is a cross section taken on line 6—6 of Fig. 4; and Fig. 7, is a longitudinal section taken on line 7—7 of Fig. 4.

Referring to said drawing, A, designates a screw threaded bolt or other threaded rod having a head 10, on one end. 11 designates the object through which the bolt or rod extends, and 12, designates the nut. The bolt has screw threads 13, formed upon one end and the nut has internal screw threads 9, corresponding to the screw threads on the bolt, whereby it may be screwed thereon.

The side or face of the nut, which bears upon the object 11, against which the nut is screwed, has oppositely disposed portions 14, having arc shaped faces 14ª, which may be substantially cylindrical in form, the curved plane of which extends from one side of the nut to the other; at the sides of said arc shaped portions, the faces 15, of the nut may be flat, if desired. The arrangement is such that when the nut is screwed against an object, the crest or highest point 16, of the nut comes in contact with said object before the faces 15, contact with the object.

Adjacent said arc shaped face, and extending parallel therewith, is a narrow slot 17, and the arched portions 14, are formed with radial slits 17ª, thereby dividing each arched portion 14, into two bendable lugs, 18. It is to be understood that the internal screw threads of the nut are formed on the lugs 18, as well as in the main body portion 19, thereof. The metal at the sides of the slot 17 (indicated at 20) should be thick enough to effectively resist any appreciable movement of the lugs in a direction away from the bolt, when the nut is screwed down tight against any object.

In use, the nut is placed upon the threaded end of the bolt with the arched portions 14, facing the object which is to be held by the bolt and nut, and the nut is screwed up against said object, the crests of the two arched portions striking said object first when the nut contacts therewith. From this position, and until the nut is screwed home, the lugs 18, bend toward the object, the binding action taking place from the slitted ends of the lugs and outward, it being understood that side portions 20, of the nut, in moving from the position shown in Fig. 3, to that shown in Fig. 4, force said lugs flat upon the object against which the nut is screwed. Since the lugs 18, are held against appreciable outward movement by the portions 20, the lugs are crowded toward each other when bent flat and the screw threaded ends thereof consequently impinge against the threads of the bolt in a direction indicated by the arrows, $a$. Furthermore, since the free ends of the lugs, can not move down with the remainder of the nut, as it is being turned home, the threads at and near the said ends impinge against the threads of the bolt in the direction indicated by the arrow, $b$, this pressure increasing until the nut is screwed home. The pressure becomes so great that the threads at the lugs and adjacent the free ends thereof are distorted, but not permanently so because by applying great force the nut may be unscrewed without mutilating the threads. The gripping and binding action effectively holds the nut against unscrewing and positively locks it on the bolt.

I claim as new and desire to secure by Letters Patent:

1. A nut lock, comprising a nut body formed with a plurality of bendable lugs extending toward the center of the nut, said lugs being located on that side of the nut which contains its bearing face, the bearing face of said lugs being of arched formation, and said body and lugs being internally screw threaded.

2. A nut lock, comprising a nut body formed with a plurality of oppositely disposed, bendable lugs, projecting toward the middle of the nut from two of its opposite sides, said lugs being located on that side of the nut which contains its bearing face, and being arched toward the middle of the nut, the body and lugs being internally screw threaded.

3. A nut lock, comprising a nut body having oppositely disposed, bendable lugs, projecting toward the middle of the nut, said lugs having arched bearing surfaces, and the nut body and lugs being internally screw threaded.

4. A lock nut, comprising a body portion, oppositely disposed, bendable lugs projecting inwardly from the edges of the nut, said lugs being spaced from the body and connected therewith integral connecting portions, the lugs being located on the bearing side of the nut and being arched toward the middle of the nut, and there being flat bearing faces adjacent said lugs.

WILLIAM R. McCOLLOM.